No. 621,773. Patented Mar. 21, 1899.
L. BLATZ.
FRUIT PRESS.
(Application filed May 27, 1898.)
(No Model.) 2 Sheets—Sheet 1.
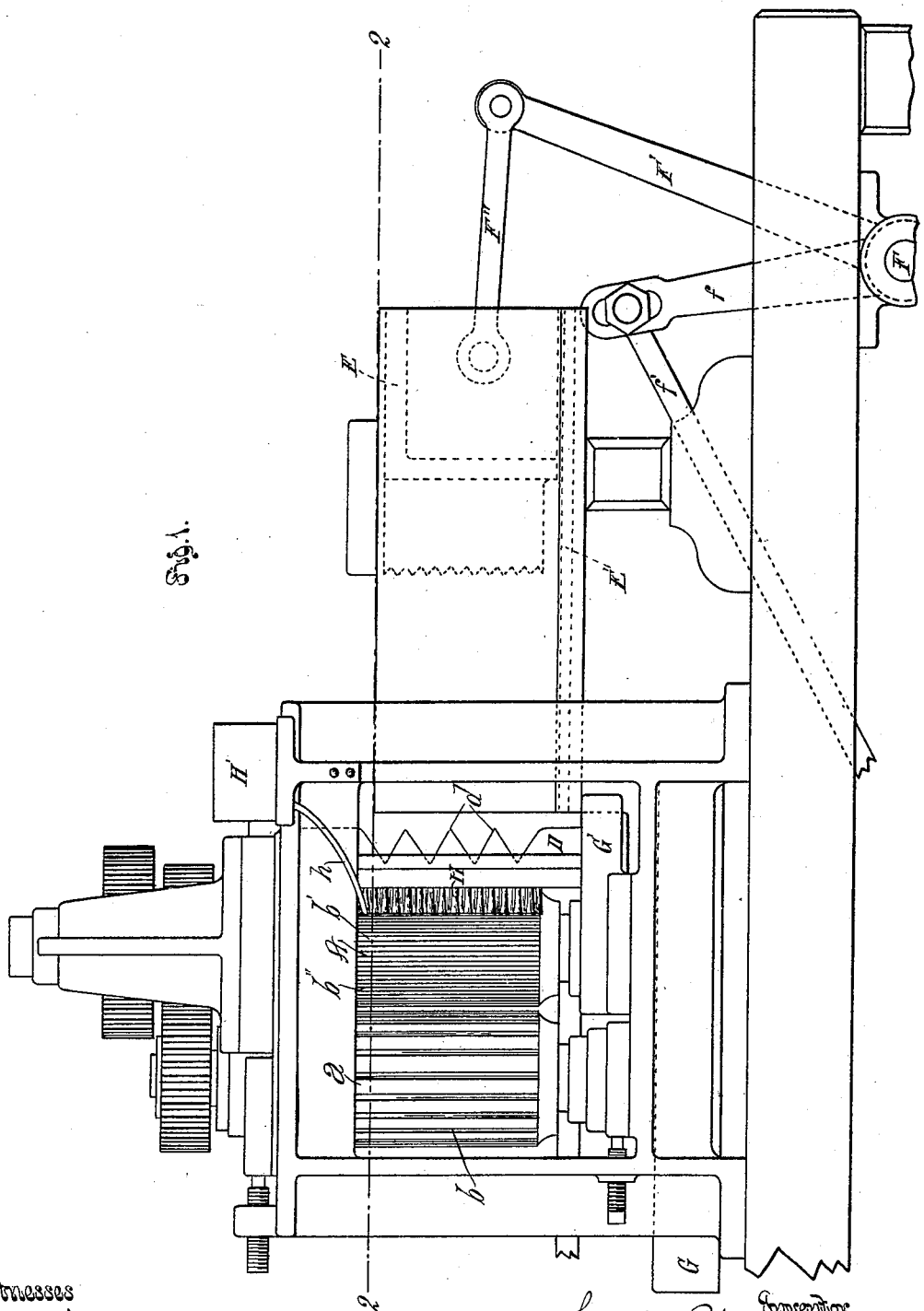

No. 621,773. Patented Mar. 21, 1899.
L. BLATZ.
FRUIT PRESS.
(Application filed May 27, 1898.)
(No Model.) 2 Sheets—Sheet 2.
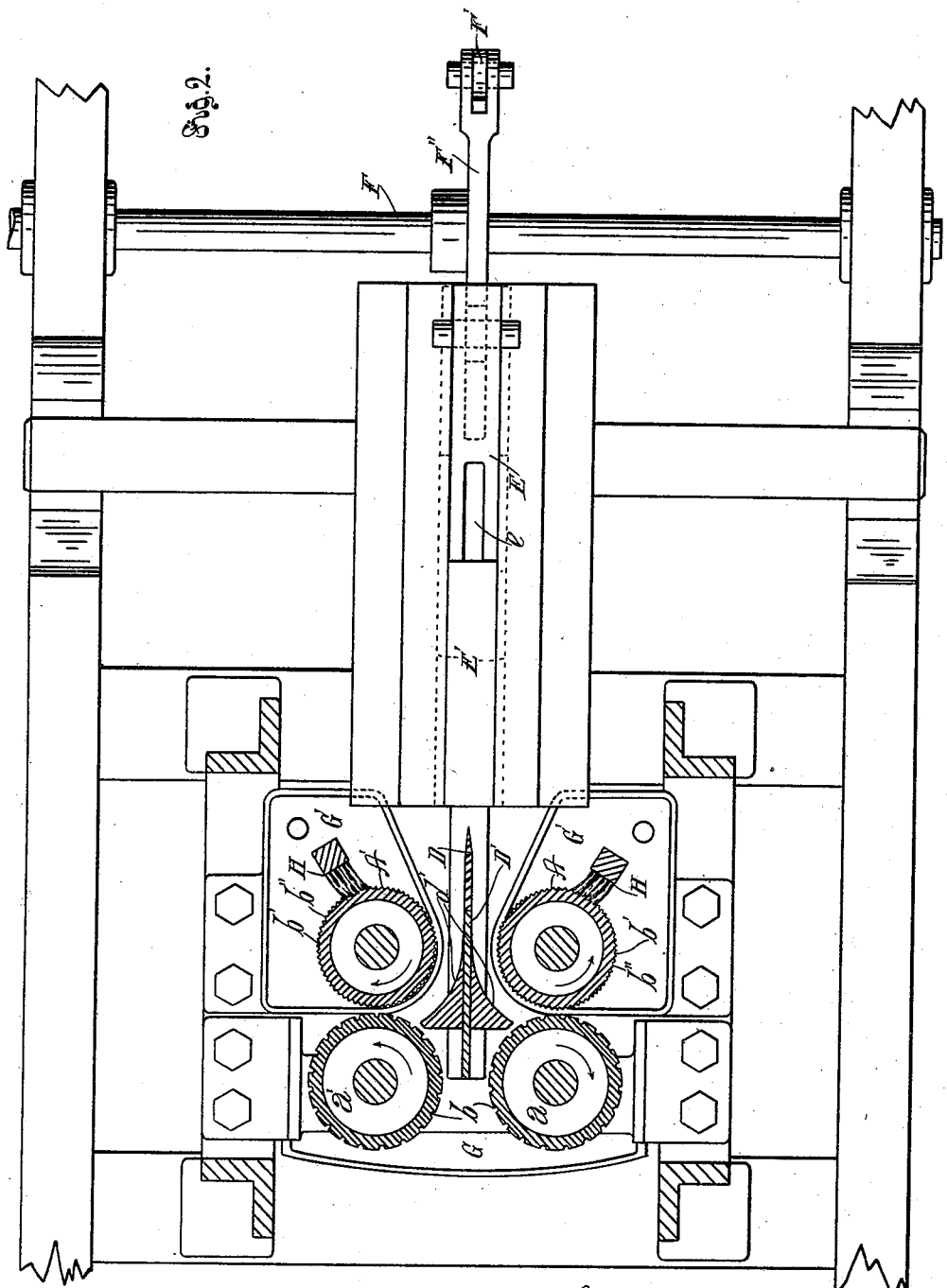

UNITED STATES PATENT OFFICE.

LOUIS BLATZ, OF LA MIRADA, CALIFORNIA.

FRUIT-PRESS.

SPECIFICATION forming part of Letters Patent No. 621,773, dated March 21, 1899.

Application filed May 27, 1898. Serial No. 681,928. (No model.)

*To all whom it may concern:*

Be it known that I, LOUIS BLATZ, a citizen of the United States, residing at La Mirada, in the county of Los Angeles and State of California, have invented a new and useful Fruit-Press or Machine for Extracting and Separating the Juices and Essential Oils from Citrus Fruits, of which the following is a specification.

The object of my invention is to provide a machine which will be adapted to rapidly and effectively extract from citrus fruits, such as lemons, the juice and at the same operation to also extract from the skin of the fruit the essential oils contained therein, delivering the extracted juice into one receptacle and delivering the essential oils into another receptacle.

My invention embraces the various features of construction and combinations of parts whereby I am enabled to provide a machine which will expeditiously and effectively operate to attain the objects hereinabove set forth.

The accompanying drawings illustrate my invention.

Figure 1 is a fragmental side elevation showing the novel features of a machine embodying my invention. Fig. 2 is a sectional plan view of the same on line indicated by 2 2, Fig. 1.

In the drawings, A A′ represent oppositely-rotating rollers which are arranged with a space between them. At the rear of each roller I arrange a suitable presser-face against which to press the fruit operated upon. These faces, as shown in the drawings, are formed of rollers $a$ $a'$, which are the juice-expressing rollers and are provided with a number of longitudinal grooves $b$. The rollers A A′ at the front are the oil-expressing rollers, and are provided with grooves $b'$, which form sharp ridges or projections $b''$, which are sufficiently sharp to perforate the oil-cells of the rind of the fruit. By means of suitable gears the rollers of each pair of rollers are so arranged that their inner faces travel toward each other, so that the fruit will be drawn inward, pass between the rollers, and the refuse delivered on the outside thereof. Arrows in Fig. 2 indicate the direction of rotation of the rollers.

D is a knife which is provided with serrations or teeth $d$, which are adapted to enter the fruit and to sever it. At the rear of this knife is arranged a tongue or vertical partition D, which is in effect a continuation of the knife and is provided upon opposite sides with outwardly-curved blocks $d'$, which combine to form a spreader-block which directs the halves of the severed fruit outward and between the pairs of rollers.

E is a pusher or feeder block which is arranged to slide in suitable guideways E′ toward and from the knife D, and is provided with a vertical slot $e$, which straddles or chambers the knife when the pusher-block is pushed inward to its fullest extent, so that the block is adapted to push the fruit against the knife and to sever it and to also push the fruit onward into the machine sufficiently far that the spreader-blocks will direct each half of the severed fruit outward between the rolls, and the rolls which grasp it will carry it on through and expel the rind from the machine. Suitable means are provided for operating the pusher-block intermittently. As shown in the drawings, this means consists of a power-shaft F, to which is connected an arm F′ and a link F″, connecting the arm with the pusher-block. An actuating-arm $f$ is also secured to the shaft and is operated by means of a pitman-rod $f'$, which is actuated by the power by which the rolls are rotated. (Not shown.)

G is a juice-pan which is adapted to receive the juice expressed from the fruit, and G′ are pans which receive the essential oil expressed from the rind of the fruit.

H H represent brushes which are arranged to engage with the outer face of each of the rollers A A′, and H′ are pans through which fluid, such as water, is by a spout $h$ delivered to the brushes to thereby cause the brushes to thoroughly scour the surfaces of the rollers and to cause the oil mingled with the water to flow downward and discharge into the oil-pan.

In practical operation power is applied to rotate the rollers and to operate the presser-block, and then the fruit, such as a lemon, is dropped into the guideway in front of the pusher-block, the greatest diameter of the fruit being preferably arranged parallel with the knife. The pusher-block upon being forced inward carries the fruit against the knife D, the points $d$ of which enter the fruit and divide it into two portions. After the fruit is severed the movement of the pusher-block forces the two halves of the fruit on between the tongue D' and the rollers and into contact with the spreader-block $d'$, whereby the two halves are directed outward between the rollers of each pair of rollers. The rollers grip the fruit, and as it is carried in between the rollers the juice from the pulp which is presented toward the rear is expressed by the rollers $a\ a'$, while the sharp points or projections upon the rollers A A' enter into the oil-cells of the rind, which is presented toward the front, and puncture them, so that the oil squirts out into the grooves between the points and is there retained, while the pressed rind and pulp passes on through the rollers and into a suitable discharge-chute which may be provided for the purpose of carrying the refuse from the machine. The expressed juice passes downward into the juice-pan, and as the rollers A A' revolve the brushes H brush the surfaces thereof, and the water dripping from the pans H' carries the oil downward into the oil-pans, from which it is conducted away by any suitable means.

Now, having described my invention, what I claim as new, and desire to secure by Letters Patent, is—

1. In a fruit-press, the combination set forth of oppositely-rotating rollers; a presser-surface for each roller; means for dividing the fruit into halves and for forcing each half of the fruit between one of the rollers and its respective presser-surface.

2. In a fruit-press, the combination set forth of two oppositely-rotating rollers; a presser-surface for each roller; a knife for severing the fruit into halves; and a presser-block for forcing the fruit against the knife and into engagement with the rollers.

3. In a fruit-pressing machine, the combination of two oppositely-arranged pairs of rollers; means for rotating the rollers of each pair of rollers toward each other; a knife for severing the fruit and arranged in front of the rollers; and means for forcing the fruit against the knife and into engagement with the rollers.

4. In a fruit-pressing machine, the combination set forth of a pair of serrated rollers rotating in opposite directions; a presser-surface for each roller; means for severing the fruit; and means for feeding one half of the fruit between each roller and its respective presser-surface.

5. In a fruit-press, the combination set forth of two oppositely-arranged pairs of rollers, one roller of each pair being provided with serrations or projections; means for severing the fruit in halves and delivering one half thereof to each pair of rollers; and means for removing the oil from each serrated roller.

6. In a fruit-press, the combination set forth of two oppositely-arranged pairs of rollers, one roller of each pair being provided with serrations or projections; means for rotating each pair of rollers toward each other; means for severing the fruit in halves; means for feeding one half of each fruit to each pair of rollers; a brush arranged to engage each serrated roller; and means for supplying liquid to the surface of the roller.

7. In a fruit-press, the combination set forth of rotating rollers, a knife arranged between the rollers; a presser-block provided with a groove to receive the knife and adapted to press the fruit against the knife and to sever it in halves; and means for rotating the rollers toward each other.

8. In a fruit-press, the combination set forth of two serrated rollers; a presser-face for each roller; means for rotating said rollers toward each other; a knife arranged between the rollers; a presser-block provided with a groove to receive the knife; means for reciprocating the presser-block; and means for removing the expressed oil from the surface of the serrated rollers.

9. The combination set forth of the oppositely-rotating rollers; the knife arranged between the rollers; and the spreader-block arranged at the rear of the knife.

10. In a fruit-pressing machine, the combination set forth of two pairs of oppositely-arranged rollers; means for rotating the rollers of each pair of rollers toward each other; a knife arranged between the pairs of rollers; and a spreader-block arranged to direct the fruit severed by the knife outward between the rollers of each pair of rollers.

11. In a fruit-pressing machine, the combination set forth of the four rollers; means for driving the rollers; the spreader-block arranged between the four rollers and provided with the forwardly-projecting tongue; and the knife secured in front of the tongue.

12. In a fruit-pressing machine, the combination set forth of the four rollers; means for rotating the rollers; a spreader-block arranged between the rollers; a knife arranged in front of the spreader-block; and a presser-block to force the fruit against the knife and to sever it.

LOUIS BLATZ.

Witnesses:
ALFRED I. TOWNSEND,
JAMES R. TOWNSEND.